No. 891,607.

PATENTED JUNE 23, 1908.

F. DORONT.
SHOCK ABSORBER.
APPLICATION FILED SEPT. 25, 1907.

WITNESSES

INVENTOR
Frank Doront
BY
ATTORNEYS

UNITED STATES PATENT OFFICE.

FRANK DORONT, OF PATERSON, NEW JERSEY.

SHOCK-ABSORBER.

No. 891,607.

Specification of Letters Patent.

Patented June 23, 1908.

Application filed September 25, 1907. Serial No. 394,452.

*To all whom it may concern:*

Be it known that I, FRANK DORONT, a subject of the King of Italy, and a resident of Paterson, in the county of Passaic and State of New Jersey, have invented a new and Improved Shock-Absorber, of which the following is a full, clear, and exact description.

This invention relates to certain improvements in shock absorbers, especially adapted for use in connection with vehicle springs for reducing the amplitude thereof and rendering the action of the springs more even and uniform.

The object of the invention is to so construct the device that it may be attached to any vehicle irrespective of the distance between the points of attachment, without interfering with the predetermined relationship of the resistance members.

A further object of the invention is to provide certain improvements in the means for resisting the free movement of the members and varying the resistance in accordance with the extent of the movement of the members in respect to each other.

Figure 1:
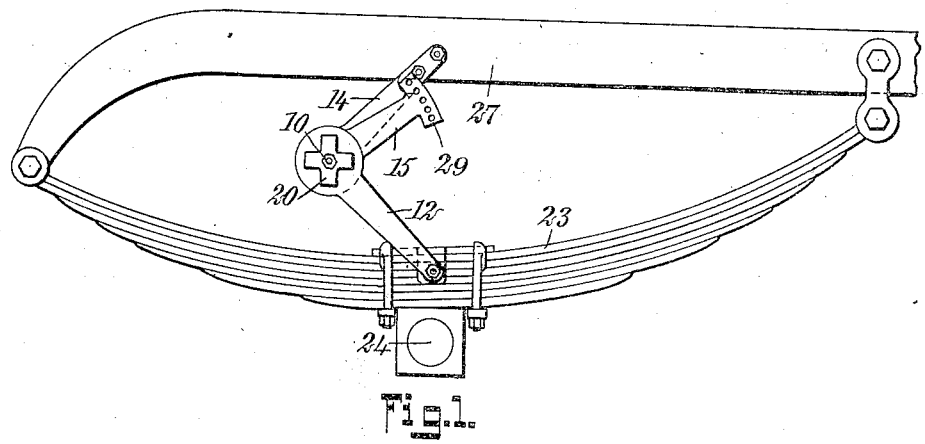
Figure 2:
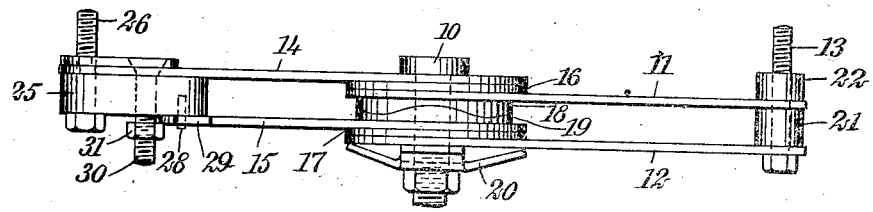
Figure 3:
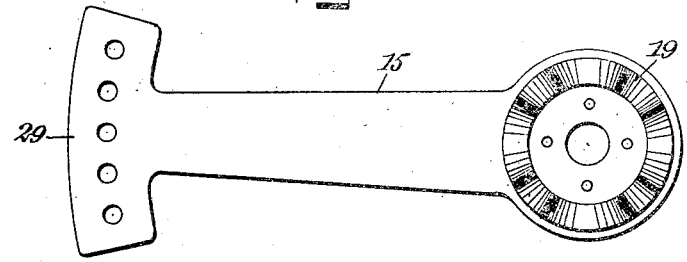

Reference is to be had to the accompanying drawings, forming a part of this specification, in which similar characters of reference indicate corresponding parts in all the figures, and in which Figure 1 is a side elevation of a portion of a vehicle provided with one of my improved shock absorbers; Fig. 2 is an end view of a detached shock absorber; and Fig. 3 is a view showing one of the operating arms or bars and one of the resistance members carried thereby.

In the preferred construction of my improved device, there are provided two operating members pivoted together and each having its outer end adapted to be connected to a part of the vehicle, the parts to which the two members are connected being movable in respect to each other and normally spaced by the vehicle spring. At the pivotal connection of the two members means are provided offering a resistance to the movement of one member in respect to the other, and the attaching means is so constructed that the two members may be secured to separate parts of the vehicle, irrespective of their distance apart, but without affecting the predetermined adjustment and relationship of the resistance means.

Each of the members preferably includes two arms or bars, all of the arms or bars being pivoted upon a single bolt 10. The arms or bars 11 and 12 of one member are secured together at their outer ends by means of a bolt 13, which bolt serves as a means for securing the member to a part of the vehicle, while the arms or bars 14 and 15 of the other member are so connected together at their outer ends that one member may be moved in respect to the other and rigidly secured in its adjusted position. The arms or bars of one member are arranged upon the bolt 10 alternately with the arms or bars of the other member, and resistance members are inserted within the adjacent bars.

Between the outermost bar 14 of one member and the outermost bar 11 of the other member, there is inserted a fiber washer 16 of any suitable thickness, and of a diameter substantially equal to the width of the arms at their inner ends. Between the outermost bar 15 and the outermost bar 12 at the opposite side there is provided a similar fiber washer 17. These disks offer a resistance to the free movement of one member in respect to the other, the resistance varying with the pressure with which the bars are held in engagement with the sides of the disk. Between the bar 15 and the bar 11 is arranged means so constructed that as the bars are moved in respect to each other, they are, at the same time, spread apart longitudinally along the pivotal bolt. Preferably this means includes two plates 18 and 19 rotatable upon the bolt 10, and each plate is rigidly secured to its adjacent arm. The engaging faces of the two plates are provided with radially disposed grooves and ridges forming a plurality of cam surfaces of comparatively low pitch. At either or both ends of the bolt, outside of the outermost bar, there is provided a spring 20 for holding the cam surfaces of the plates 18 and 19 firmly in engagement with each other. The spring illustrated is a leaf spring having its central portion in engagement with the nut of the bolt and having a plurality of branches extending at an angle therefrom and engaging with the surface of the adjacent bar. The outer ends of the bars 11 and 12 are spaced apart by a sleeve 21, and through this sleeve and a second spacing sleeve 22 extends the bolt 13, by means of which the end of the member is rigidly secured to a part of the vehicle, as, for instance, the spring 23 adjacent the axle 24.

The outer end of the bar 14 is spaced from the outer end of the bar 15 by a spacing block 25 of a thickness equal to the length of the sleeve 21. The bar 14 is of a length substantially equal to that of the bars 11 and 12, but the bar 15 is somewhat shorter. An attaching bolt 26 extends through the outer end of the bar 14 and the spacing block 25, and serves for securing the member to a part of the vehicle, as, for instance, the frame 27. The bar 15 is directly connected to the spacing block and is angularly adjustable in respect thereto. As shown, the spacing block 25 is provided with a pin 28, and the bar 15 is provided with a head portion 29 of a width somewhat greater than the width of the bar and provided with radially disposed openings adapted for the reception of the pin 28.

Extending through the spacing block and disposed adjacent the end of the head 29, there is provided a bolt 30, the nut 31 of which serves to engage with the outer surface of the head 29 and bind the same to the spacing block 25. By loosening the nut 31, the outer end of the bar 15 may be moved laterally out of engagement with the pin and then moved angularly to any desired position. The bar is then brought into engagement with the block 25 and with the pin 28 entering one of the openings in the head 29. The nut 31 is then tightened to firmly and rigidly bind the bars together.

As the cam-surfaced plates 18 and 19 are rigidly connected to the bars 11 and 15, it will be noted that there are certain predetermined angular positions of these two bars in respect to each other, at which the highest portions of the cams of one plate will enter the lowest portion of the recesses of the other plate and the bars 11 and 15 will approach to the minimum distance apart. At this time the spring 20 exerts its minimum influence and the bars engage with the fiber washers with the minimum resistance. As either bar is moved in respect to each other, the cams mount each other and the resistance to movement is increased in accordance with the extent of this movement until the highest portion of one cam engages with the highest portion of the other, at which the maximum resistance will be offered.

In attaching the shock absorbers to vehicles, it is desirable that with the vehicle carrying the normal load and with the vehicle springs under the normal compression, the shock absorber should offer the minimum resistance. Due to the difference in construction of different vehicles, the distance between the frame and the axle or the other parts to which it is desired to attach the shock absorber varies greatly, but with my improved construction the absorber may be attached to parts at variable distances apart, while retaining the resistance members in such positions that they act with the minimum effect when the vehicle carries the normal load.

In attaching the device in place, the bolt 13 is secured to one of the members and the bolt 26 secured to the other member. The nut 31 is loosened and the bar 15 moved to such a position that the cams occupy the positions shown in Fig. 2, when the vehicle spring is compressed to the normal extent. The bar 15 is then rigidly secured to the bar 14, and any compression or expansion of the vehicle spring is restricted and the disagreeable effects of a free movement of the spring obviated.

Having thus described my invention I claim as new and desire to secure by Letters Patent:

1. In combination, two supporting members pivotally connected together, each of said members comprising two substantially parallel arms arranged alternately with the arms of the other member at the pivotal point, means intermediate each arm of one member and a corresponding arm of the other member for offering a resistance to the movement of said members, and resilient means for forcing said arms and resistance means into engagement with each other, one arm of each of said members presenting a cam surface at the pivotal point for varying the tension of said resilient means and varying the resistance.

2. In combination, two supporting members pivotally connected together, each of said members presenting a cam surface in engagement with the cam surface of the other member at the pivotal point, resilient means for holding said cam surfaces in engagement with each other, one of said members including two arms pivoted to the other member, means for securing the outer end of one of said arms and the outer end of the other member to parts movable in respect to each other, and adjustable means for securing the outer ends of said arms together to vary the angularity of one of said arms in respect to the other member.

3. In combination, two members, one of which is movable in respect to the other, means for resisting said movement, said members having predetermined relative positions and said means offering the minimum resistance to movement when said members are in said positions, one of said members including two arms pivoted to the other member, means for attaching the outer end of one of said arms and the other member to parts movable in respect to each other, and means for rigidly connecting together the outer ends of said arms, with said arms at varying angles to each other, whereby the normal predetermined relative position of said members may be retained independent of the normal distance between the points of attachment.

4. In combination, two members, each having a securing point, a resistance to the normal movement of said members in respect to each other, said resistance being at the minimum with the members in predetermined relative positions, one of said members including two arms pivoted to the other member, and means for rigidly securing together the outer ends of said arms at varying distances apart, whereby the normal distance between said securing points may be varied without varying said predetermined relationship of the members.

5. In combination, two members pivotally secured together and each having a securing point, a resistance to the movement of said members in respect to each other, said resistance being disposed at said pivotal point, one of said members comprising two arms pivoted together, said securing point being carried by one of said arms and said resistance being carried by the other of said arms, and means for rigidly securing said arms together at varying angles in respect to each other, whereby the distances between said securing points may be varied without altering the predetermined relationship of the members in respect to the resistance.

6. A shock absorber, including two supporting arms pivotally connected together, two plates intermediate the said arms at their pivotal points and each presenting a cam surface in engagement with the cam surface of the other plate, resilient means for forcing said cam surfaces into engagement with each other, and means for securing the outer ends of said arms to members movable in respect to each other and having normal positions at varying distances apart, without altering the relative positions of said plates in respect to each other.

7. A shock absorber, including two supporting members pivotally connected together, each of said members comprising two substantially parallel arms arranged alternately with the arms of the other member at the pivotal point, one arm of each of said members presenting a cam surface at the pivotal point, a spring for forcing said cam surfaces into engagement with each other, and means for securing the opposite ends of said members to parts movable in respect to each other.

8. A shock absorber, including two supporting members pivotally connected together and each presenting a cam surface engaging with the cam surface of the other member at the pivotal point, attaching means at the outer end of one of said members, and means movable in respect to the other member and adapted to be rigidly connected thereto for attaching said last-mentioned member to a part movable in respect to the attaching point of the other member but with said members in a predetermined angular relationship.

9. A shock absorber, including two supporting members pivotally connected together, one of said members comprising two substantially parallel arms and the other of said members having one arm extending between the arms of the first-mentioned member at the pivotal point, the arm of said second-mentioned member and one of the arms of the first-mentioned member presenting cam surfaces in engagement with each other at the pivotal point, and a resistance member intermediate the other of the arms of the first-mentioned member and the arm of the second-mentioned member at the pivotal point.

10. A shock absorber, including two supporting members pivotally connected together, one of said members comprising two substantially parallel arms and the other of said members having one arm extending between the arms of the first-mentioned member at the pivotal point, the arm of said second-mentioned member and one of the arms of the first-mentioned member presenting cam surfaces in engagement with each other at the pivotal point, a resistance member intermediate the other of the arms of the first-mentioned member and the arm of the second-mentioned member at the pivotal point, and a spring, the tension of which is varied by a movement of the members and the cam surfaces in respect to each other.

In testimony whereof I have signed my name to this specification in the presence of two subscribing witnesses.

FRANK DORONT.

Witnesses:
STEWART TAYLOR,
HIRAM M. QUICK.